United States Patent Office 2,942,935
Patented June 28, 1960

2,942,935
PREPARATION OF BOROHYDRIDES

Aden J. King and Virginia A. Russell, Syracuse, N.Y., assignors, by mesne assignments, to Olin Mathieson Chemical Corporation, a corporation of Virginia No Drawing. Filed July 9, 1956, Ser. No. 596,415

7 Claims. (Cl. 23—14)

This invention relates to the preparation of borohydrides by the general reaction of hydrolysis of magnesium diboride, $MgB_2$ with bases. More particularly, this invention relates to the preparation of alkali metal and ammonium borohydrides by reaction of magnesium diboride with the corresponding bases.

It has previously been reported that the reaction of a magnesium boride, prepared from magnesium and boron trioxide, and dilute potassium hydroxide solution produced the potassium salts of the isomeric borohydrates. It has now been found, however, that the reaction of magnesium diboride in a relatively strong basic medium produces the borohydride of the corresponding base.

Thus according to this invention, alkali metal and ammonium borohydrides are prepared by contacting magnesium diboride with an alkali metal or an ammonium hydroxide in a reaction medium such that the basicity of the reaction medium is at least equivalent to that of a 2 molar potassium hydroxide solution in a mole ratio of hydroxide to magnesium diboride of 1:1. Higher percent conversions of boron to borohydride are obtained with more strongly basic reaction media. In addition to water as the reaction medium, non-aqueous reaction media such as methyl and ethyl alcohol are suitable. Also, some bases such as potassium hydroxide can be reacted in the fused state with the magnesium diboride. When the reaction is carried out in an aqueous reaction medium, the reaction temperature is preferably maintained below about 100° C.

The borohydrides produced according to this invention are useful as sources of hydrogen and as reducing agents. For example, upon acidification they readily liberate hydrogen. In dry form the alkali metal borohydrides may be contacted with a non-aqueous acid such as $BF_3$ to produce diborane. The reaction is performed in a medium of anhydrous diethyl ether, with the usual precautions to exclude air. Diborane is useful as a welding fuel according to the method described in U.S. Patent 2,582,268.

This invention will be further illustrated by the following examples. The magnesium diboride employed in the examples was prepared by direct combination of boron and magnesium in a closed system at 950° C. under an atmosphere of argon. The commercial grade contains about 82.4 weight percent magnesium diboride and the balance is essentially magnesium.

Example I 46 grams of commercial $MgB_2$ (82.4%) are digested for 3–6 hours in a Florence flask with 250 ml. of 8 molar KOH solution under conditions which permit the temperature of the reaction to be controlled. The temperature is maintained at a value somewhat below 100° C. When the reaction is complete, as indicated by the cessation of the copious evolution of hydrogen, the mixture is quickly filtered. The filtrate which has a brownish purple color and which continues to evolve hydrogen slowly is found to contain on analysis 12.4 grams of potassium borohydride. By fractional crystallization in vacuum, crystals of pure $KBH_4$ are obtained which show the characteristic X-ray diffraction pattern of this substance and which agree with this composition on chemical analysis.

Example II 23 grams of $MgB_2$ (82.4 percent) are digested for 8 to 12 hours in 250 ml. of 3 M KOH. The reaction mixture is kept well stirred and cooled during the addition of the $MgB_2$ to the base and during the first few hours of the reaction. Thereafter the reaction runs smoothly at room temperature. The water soluble fraction is rapidly filtered and slowly evaporated under vacuum. Due to their relatively low solubility the first crystals are easily separated from the remainder of the solution by filtration. Analytical data show that this product of the hydrolysis of $MgB_2$ and strong KOH was $KBH_4$ (boron: calcd. 20.06 percent; found, 19.99 percent). Four moles of gas per mole of $KBH_4$ are evolved upon acidification, in agreement with the equation:

$$KBH_4 + H^+ + 3H_2O \rightarrow H_3BO_3 + K^+ + 4H_2$$

The observed value of $a_0^{25°} = 6.7274 \pm 0.0003$ A.U. compares quite favorably with the reported value for $KBH_4$ of $a_0^{25°} = 6.7274$ A.U. [S. C. Abrahams and J. Kalnais, J. Chem. Phys., 22, 434 (1954)]. A total yield of 5.72 grams $KBH_4$ is obtained, as determined by the amount of $H_2$ evolved upon acidification of the solution. Other crystals which formed in the solution are found by analysis to be a potassium borate of the formula $KBO_2 \cdot 1¼ H_2O$. The powder diffraction pattern shows principal lines having "d" values of 5.5m, 3.78m, 2.97s, 2.73m, 2.48m, 2.25s, 1.85m and 1.60m. After all the $KBH_4$ is removed the filtrate is acidified with dilute $H_2SO_4$. The acidified solution still contains compounds with the ability to reduce ceric or dichromate ions, simultaneously liberating $H_2$.

Example III 7.7 grams of $MgB_2$ are reacted in 85 ml. of 4 M $(CH_3)_4NOH$, filtered, and the filtrate slowly evaporated in vacuum. The first crystalline product to separate from the solution is $(CH_3)_4NBH_4$. The equivalent of 4.04 gms. of $(CH_3)_4NBH_4$ is obtained, as determined by $H_2$ yield analysis. The resulting soluble fraction is evaporated and square platelets crystallize from the solution. A powder diffraction pattern of this product shows it to crystallize in the tetragonal system. The dimensions of the primative unit cell are $$a_0 = 7.92 \text{ A.U.}, \ c_0 = 5.69 \text{ A.U.}, \ c/a = 0.719$$

This appears to be isomorphous with $(CH_3)_4NCl$ whose dimensions are:

$$a_0 = 7.78 \text{ A.U.}, \ c_0 = 5.53 \text{ A.U.}, \ c/a = 0.71$$

It is quite evident therefore that the product is $(CH_3)_4N \cdot BH_4$-tetramethylammonium borohydride, with the $BH_4$ occupying the position of the Cl in the structure. The calculated increase in the cell dimensions which would result from such a substitution are in good agreement with the observed values.

Example IV 5 grams of $MgB_2$ (82.4%) and 25 grams of KOH are refluxed with 270 ml. of absolute ethyl alcohol in a standard reflux apparatus for 3 hours, cooled and filtered, X-ray analysis shows the presence of an amount of $KBH_4$ equivalent to 15.5% conversion of the boron in the original magnesium diboride into potassium borohydride.

Example V 11.5 grams commercial $MgB_2$ is treated with 62.5 ml. of 4 molar $NH_4OH$ and allowed to digest for 18 hours at a temperature below 100° C. and then filtered. The filtrate is found to contain the equivalent 0.8 gram of $NH_4BH_4$ as determined by the hydrogen yield on acidification.

*Example VI*

46 grams of commercial $MgB_2$ (82.4 percent $MgB_2$) are treated with 250 ml. of 4 molar NaOH and the temperature kept below 100° C. during the reaction. After the reaction is complete the reaction mixture is filtered. The resulting solution is found on analysis to contain 7.98 grams of $NaBH_4$.

*Example VII*

23 grams of $MgB_2$ of commercial purity (82.4 percent) are digested at a temperature below 100° C. for three hours with 250 ml. of 4 molar LiOH solution. After the reaction is complete, the mixture is filtered and the filtrate is found on analysis to contain the equivalent of 0.093 mol or 2.03 g. of $LiBH_4$.

*Example VIII*

23 grams of commercial $MgB_2$ (82.4 percent) are refluxed for 6 hours with 150 ml. of a 35 percent solution of benzyl trimethyl ammonium hydroxide in methyl alcohol. The filtrate resulting from the reaction is found to contain the equivalent of 4.38 grams of $$C_6H_5CH_2(CH_3)_3NBH_4$$

In general, one mole of KOH per mole of $MgB_2$ is sufficient to complete the reaction but the use of higher concentrations of base increases the overall yields of the borohydride. This dependency is quite reasonable, if it is assumed that the hydrolysis of $MgB_2$ involves the initial formation of boranes, since the conversion of boranes to borohydrides is improved by increasing the basic strength of the solutions. In addition, a strongly basic medium decreases the rate of decomposition of borohydrides. The competing reaction which destroys most of the initially formed boranes is the hydrolysis of the boranes to give $H_2$ and boric acid.

Thus the efficiency of the reaction is a function of the mole-ratio of base to magnesium boride, the molarity of the basic solution, or in general, the relative basicity of the basic medium. If any one of these is increased the yield is increased accordingly. This may be due to a decrease in the rate of decomposition of the borohydride ion, to a more favorable environment for the progress of desired intermediate reactions, or to other factors not at present understood. This is illustrated in part by the following table:

| Mole Ratio | Molarity, KOH | Percent Conversion B to $KBH_4$ |
|---|---|---|
| 2 KOH:1 $MgB_2$ | 8 | 11.5 |
| 2 KOH:1 $MgB_2$ | 4 | 9.0 |
| 1 KOH:1 $MgB_2$ | 2 | 8.5 |
| ¾ KOH:1 $MgB_2$ | 3 | 4.3 |

It is probable that diborane ($B_2H_6$) is one of the intermediates in the production of borohydrides from magnesium diboride. Diborane reacts with water according to the reaction:

(1)     $B_2H_6 + 6H_2O \rightarrow 6H_2 + 2H_3BO_3$

Diborane reacts with bases to form the borohydride as follows:

(2)     $2B_2H_6 + 4MOH \rightarrow 3MBH_4 + MBO_2 + 2H_2O$ and the borohydride ion thus formed reacts with water according to the equation (3)     $BH_4^- + 2H_2O \rightarrow BO_2^- + 4H_2$ It is evident from the above equations that the presence of water in the reaction medium will adversely affect the yield of borohydride. Hence, if a nonaqueous medium is used the efficiency of conversion of $MgB_2$ to borohydride is enhanced. The examples indicate that one could produce any borohydride from the general reaction of hydrolysis of $MgB_2$ with a suitable base. The borohydride can be isolated from solution if it is stable in the basic medium at room temperature and less soluble than its borate, also present in solution.

We claim:

1. Method for the preparation of alkali metal and ammonium borohydrides from magnesium diboride of the formula $MgB_2$ which comprises contacting magnesium diboride of the formula $MgB_2$ with a hydroxide selected from the group consisting of alkali metal and ammonium hydroxides in a mole ratio of hydroxide to magnesium diboride of at least 1:1, the hydroxide being dissolved in a reaction medium selected from the group consisting of water, methanol and ethanol, and the molarity of the hydroxide solution being at least 2.

2. The method of claim 1 in which the hydroxide is potassium hydroxide.

3. The method of claim 1 in which the hydroxide is lithium hydroxide.

4. The method of claim 1 in which the hydroxide is sodium hydroxide.

5. The method of claim 1 in which the hydroxide is ammonium hydroxide.

6. The method of claim 1 in which the hydroxide is tetramethyl ammonium hydroxide.

7. The method of claim 1 in which the hydroxide is benzyl trimethyl ammonium hydroxide.

References Cited in the file of this patent

Ray: "Chemical Abstracts," 19; 1669⁵ (1925).
Ray: "Chemistry and Industry," pp. 332–324 (1946).
Stock: "Hydrides of Boron and Silicon," p. 149, Cornell University Press, 1933.
Stone: "Quarterly Reviews" (London), vol. 9, No. 2, 1955, p. 199.
Schechter et al.: "Boron Hydrides and Related Compounds," prepared under Contract No. 2(S) 10992 for Dept. of Navy, Bureau of Aeronautics, by Callery Chemical Co., printed March 1951, declassified December 1953; page 53.
Markovskii: "Zhur. Obshei Khim.," vol. 25, pp. 433–444 (March 1955).
Stock: "Hydrides of Boron and Silicon," 1933, p. 38.
Mikheeva et al.: "Chemical Abstracts," 48; 490i (1954).
Jensen: "A Study of Sodium Borohydride," pp. 38–48, Nyt Nordisk Forlag, Arnold Busck, Copenhagen (1954).